US010025838B2

(12) United States Patent
Bangs et al.

(10) Patent No.: US 10,025,838 B2
(45) Date of Patent: *Jul. 17, 2018

(54) EXTRACT TRANSFORM LOAD INPUT SUGGESTION

(71) Applicant: International Business Machines Corporation, Armonk, NY (US)

(72) Inventors: Joseph Bangs, Wrentham, MA (US); Leonard D. Greenwood, Turvey (GB); Arron J. Harden, Olney (GB); Xiaoyan Pu, Chelmsford, MA (US); Julian J. Vizor, Milton Keynes (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,147

(22) Filed: Aug. 26, 2016

(65) Prior Publication Data

US 2017/0140014 A1 May 18, 2017

Related U.S. Application Data

(63) Continuation of application No. 14/944,548, filed on Nov. 18, 2015, now Pat. No. 9,471,652.

(51) Int. Cl.
*G06F 7/00* (2006.01)
*G06F 17/00* (2006.01)
*G06F 17/30* (2006.01)

(52) U.S. Cl.
CPC .... *G06F 17/30563* (2013.01); *G06F 17/3056* (2013.01)

(58) Field of Classification Search
None
See application file for complete search history.

(56) References Cited

U.S. PATENT DOCUMENTS

| | | | |
|---|---|---|---|
| 2009/0300044 A1* | 12/2009 | Zheng | G06Q 10/06 |
| 2012/0102007 A1* | 4/2012 | Ramasubramanian | G06F 17/30563 707/705 |
| 2014/0181006 A1* | 6/2014 | Greenwood | G06F 17/30563 707/602 |

OTHER PUBLICATIONS

Joseph Bangs et al., Pending U.S. Appl. No. 14/944,548 entitled "Extract Transform Load Input Suggestion," filed with the U.S. Patent and Trademark Office on Nov. 18, 2015.

(Continued)

*Primary Examiner* — Tuan A Pham
(74) *Attorney, Agent, or Firm* — Cantor Colburn LLP; Robert Bunker

(57) ABSTRACT

A method for extract transform load (ETL) input suggestions for an ETL system in which a current job is being created. A method includes: determining when a new input is made in the current job in the ETL system and dynamically receiving the new input which includes a connection between stages input or a property of a stage input; updating stored information relating to the current job with the new input; accessing rules which apply to the current job; analyzing and applying the rules based on the new input and the current job stored information to generate one or more suggested next inputs in the current job; providing a weighting for the one or more suggested next inputs based on the analysis and application of the rules; and providing a prompt in the current job in the ETL system with the suggested one or more next inputs and their weightings.

12 Claims, 9 Drawing Sheets

(56) References Cited

OTHER PUBLICATIONS

List of IBM Patents or Patent Applictions Treated as Related; (Appendix P), Filed Aug. 26, 2016, 2 pages.

* cited by examiner

EXTRACT TRANSFORM LOAD INPUT SUGGESTION

BACKGROUND

The present invention relates to extract transform and load (ETL) systems, and more specifically, to ETL input suggestion.

In the field of very large data storage repositories, such as data warehouses, there is frequently a need to take data from a plurality of sources, often under the control of heterogeneous data storage systems, and to aggregate the data in such a way as to make it capable of coherent processing. The need for aggregation of data from such a plurality of data sources has given rise to a number of systems designed to perform the tasks of extracting, transforming and loading the data.

Before a repository of data can be effectively used as a source of truly usable information, it is usually created or updated using many sources. Most often, the data that is accumulated (and later used for update of the repository) is of a different format residing on an external system than what is ultimately needed in the repository. The process of acquiring this data and converting it into useful, compatible and accurate data is often labeled ETL.

Extraction is the task of acquiring the data (in whatever format might be possible) from the source systems. This can be as simple as dumping a flat file from a database or spreadsheet, or as sophisticated as setting up relationships with external systems that then supervise the transportation of data to the target system.

Transformation is often more than just converting data formats, although this is a critical step in getting the data to the target system. Data from external systems may contain incompatible or incorrect information, depending on the checks and balances that were in effect on the external system. Part of the transformation step is to "cleanse" or "reject" the data that does not conform. Common techniques used as part of this step include character examination (for example, reject numeric value fields that contain characters) and range checking (reject values outside of an acceptable range). Rejected records are usually deposited in a separate file and are then processed by a more sophisticated tool or manually to correct the problems. The values are then rolled into the transformed set.

Load is the stage in which the captured and transformed data is deposited into the new data store (warehouse, mart, etc.). For structured query language (SQL) compatible database systems, this process can be accomplished with SQL commands (IMPORT), utilities (LOAD), or integrated tools. Additionally, the total ETL process can be accomplished via third party applications, often decreasing or eliminating the need for custom programming. The ETL process can be as simple as transferring some data from one table to another on the same system. It can also be as complex as taking data from an entirely different system that is thousands of miles away and rearranging and reformatting it to fit a very different system.

At its simplest level an ETL job is a process that will read data from one source (such as a database), transform it (for example, remove trailing spaces), and finally write it to a target (such as a file). An ETL job design consists of one or more stages, each stage performing a discrete function such as read from database, sort data, merge data, etc. The data read from stages, or written to stages, is represented as links that join the stages together. ETL job designs can vary from the simplistic, consisting of only a handful of stages to the complex where the number of stages can reach over 100.

An ETL job design is typically constructed by the user (an ETL developer) dragging and dropping stages onto a graphical canvas and then linking their input and outputs together. The stages chosen, the way they are joined together, and the value of properties set will together satisfy the high level requirements for that job.

Currently the ETL developer has to be extremely knowledgeable about the ETL application and know exactly what stages they should use to achieve this requirement. This becomes a barrier for customers who quickly want to get their developers up and running. Even for developers who are proficient with the application, it can be hard to remember exactly what stage can be linked to other stages and in what circumstances such links are recommended or not.

SUMMARY

According to an embodiment of the present invention there is provided a computer-implemented method for extract transform load (ETL) input suggestion for an ETL system in which a current job is being created, including: determining when a new input is made in the current job in the ETL system and dynamically receiving the new input; updating stored information relating to the current job with the new input; accessing rules which apply to the current job; analyzing and applying the rules based on the new input and the current job stored information to generate one or more suggested next inputs in the current job; providing a weighting for the one or more suggested next inputs based on the analysis and application of the rules; and providing a prompt in the current job in the ETL system with the suggested one or more next inputs and their weightings.

The dynamic receipt and analysis of the new input can include updating rules and information used in the analysis relating to the current job, which can allow for dynamically providing updated suggestions responsive to each input of the user.

The method may include updating stored information relating to the current job with the new input includes updating a dynamic set of rules which apply to the current job, wherein the dynamic set of rules are next stage rules and/or optimization rules.

In one embodiment, the new input may be a new stage input, and the rules which apply to the current job may be next stage rules, and the one or more suggested inputs may be suggested next stages. The next stage rules may include static rules including one or more of the group of: connectivity rules of the previous stage that was added; user configurable patterns that define commonly used layouts of stages for a specific customer environment; potential errors or warnings that are generated if a stage were to be used next. The next stage rules may include dynamic rules including: built-in patterns of existing stages in the current job; and dynamic patterns based on previous usage of stages in job designs within the current job environment. The rules which apply to the current job may further include optimization rules for optimizing the current job in addition to the next stage rules, and the one or more suggested inputs are one or more of: a new stage input, a connection between stages input, and a property of a stage input.

In another embodiment, the new input may be one of: a new stage input, a connection between stages input, and a property of a stage input; the rules which apply to the current job are optimization rules for optimizing the current job, and the one or more suggested inputs are one or more of: a new stage input, a connection between stages input, and a property of a stage input. The optimization rules may include one or more of the group of: constraint simplification; column import or export; lookup with multiple tables; inconsistent sort keys; aggregation in a transformer; parallel export; and metadata of input data.

Providing a prompt for the current job may include a visual indication of the one or more suggested inputs and an annotation as to their weightings.

The method may include monitoring the current job to determine when a new input is made in the current job in the ETL system and iterating the updating, accessing, and analyzing for each new input.

Providing a weighing for the one or more suggested next inputs may be based on a determination of the logic of the current job and the outcome of the suggested next input.

According to another aspect of the present invention there is provided a system for ETL stage or action suggestion, including: a processor and a memory configured to provide computer program instructions to the processor to execute functions of the following components; a dynamic input component including: a monitoring component for determining when a new input is made in the current job in the ETL system, an update component for dynamically receiving the new input, and an information update component for updating stored information relating to the current job with the new input; an accessible storage medium having rules which apply to the current job; an analysis component analyzing and applying the rules based on the new input and the current job stored information to generate one or more suggested next inputs in the current job; a weighting component for providing a weighting for the one or more suggested next inputs based on the analysis and application of the rules; and a dynamic suggestion output component for providing a prompt in the current job in the ETL system with the suggested one or more next inputs and their weightings.

The dynamic suggestion output component for providing a prompt for the current job may include prompting a visual indication of the one or more suggested next inputs and an annotation as to their weightings in a user interface of an ETL system.

The information update component for updating stored information relating to the current job with the new input may include updating a dynamic set of rules which apply to the current job, wherein the dynamic set of rules are next stage rules and/or optimization rules.

In one embodiment, the new input may be a new stage input, the rules which apply to the current job may be next stage rules, and the one or more suggested inputs may be suggested next stages. The next stage rules may include static rules including one or more of the group of: connectivity rules of the previous stage that was added; user configurable patterns that define commonly used layouts of stages for a specific customer environment; potential errors or warnings that are generated if a stage were to be used next. The next stage rules may include dynamic rules including: built-in patterns of existing stages in the current job; and dynamic patterns based on previous usage of stages in job designs within the current job environment. The rules which apply to the current job may further include optimization rules for optimizing the current job in addition to the next stage rules, and the one or more suggested inputs are one or more of: a new stage input, a connection between stages input, and a property of a stage input.

In another embodiment, the new input may be one of: a new stage input, a connection between stages input, and a property of a stage input; the rules which apply to the current job may be optimization rules for optimizing the current job, and the one or more suggested inputs may be one or more of: a new stage input, a connection between stages input, and a property of a stage input. The optimization rules may include one or more of the group of: constraint simplification; column import or export; lookup with multiple tables; inconsistent sort keys; aggregation in a transformer; parallel export; and metadata of input data.

The weighting component for providing a weighing for the one or more suggested next inputs may be based on a determination of the logic of the current job and the outcome of the suggested next input.

According to another aspect of the present invention there is provided a computer program product for ETL input suggestion for an ETL system in which a current job is being created, the computer program product comprising a computer readable storage medium having program instructions embodied therewith, the program instructions executable by a processor to cause the processor to: determine when a new input is made in the current job in the ETL system and dynamically receiving the new input; update stored information relating to the current job with the new input; access rules which apply to the current job; analyze and applying the rules based on the new input and the current job stored information to generate one or more suggested next inputs in the current job; provide a weighting for the one or more suggested next inputs based on the analysis and application of the rules; and provide a prompt in the current job in the ETL system with the suggested one or more next inputs and their weightings.

The described aspects can provide for analyzing a current ETL job and making dynamic suggestions for a next input. Additional features and advantages are realized through the techniques of the present invention. Other embodiments and aspects of the invention are described in detail herein and are considered a part of the claimed invention. For a better understanding of the invention with the advantages and features, refer to the description and to the drawings.

BRIEF DESCRIPTION OF THE DRAWINGS

The subject matter regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A system and method are described to provide stage suggestion information in an extract, transform and load (ETL) system. As an ETL developer works on an ETL job, context sensitive next best input suggestion(s) are generated and provided to the ETL developer. The ETL developer works on an ETL job design canvas user interface and weighted suggestions of a next input may be provided visually in the user interface.

The suggestions may be generated from static rules (configured and modifiable by an administrator) and by dynamically making use of information that is specific to the ETL job design in its current state, so as the job design is modified by the user the input suggestions will change. The evaluation of rules governing the suggestions also allows each suggestion to be presented to the ETL developer with a strength indicator, showing the degree of confidence for each piece of information.

The described system and method works with patterns for ETL job design scenarios. It is based on analyzing the design so far and comparing it with previous designs, user configuration, system rules for what is logical and/or permissible, and/or optimization. It then assigns weightings for the suggested next input.

Examples of the rules that the suggestions may be based on include, but are not limited to: the connectivity of the last stage that was added; built-in patterns of existing stages in the job design; user configurable patterns that define commonly used layouts of stages for a specific customer environment; dynamic patterns based on previous usage of stages in job designs within the current users environment; and potential errors or warnings that would be generated if the stage were to be used next.

As the job design is built up, the system may continually suggest new optimization options for changing the design of the job, and indicating which option is best. Suggestions may be provided of how to link stages together based on what has been designed in a job so far.

In practice, the ETL designer may select a stage already present in the design, and the system may suggests possible choices that would make sense to add at that point.

Figure 1A:
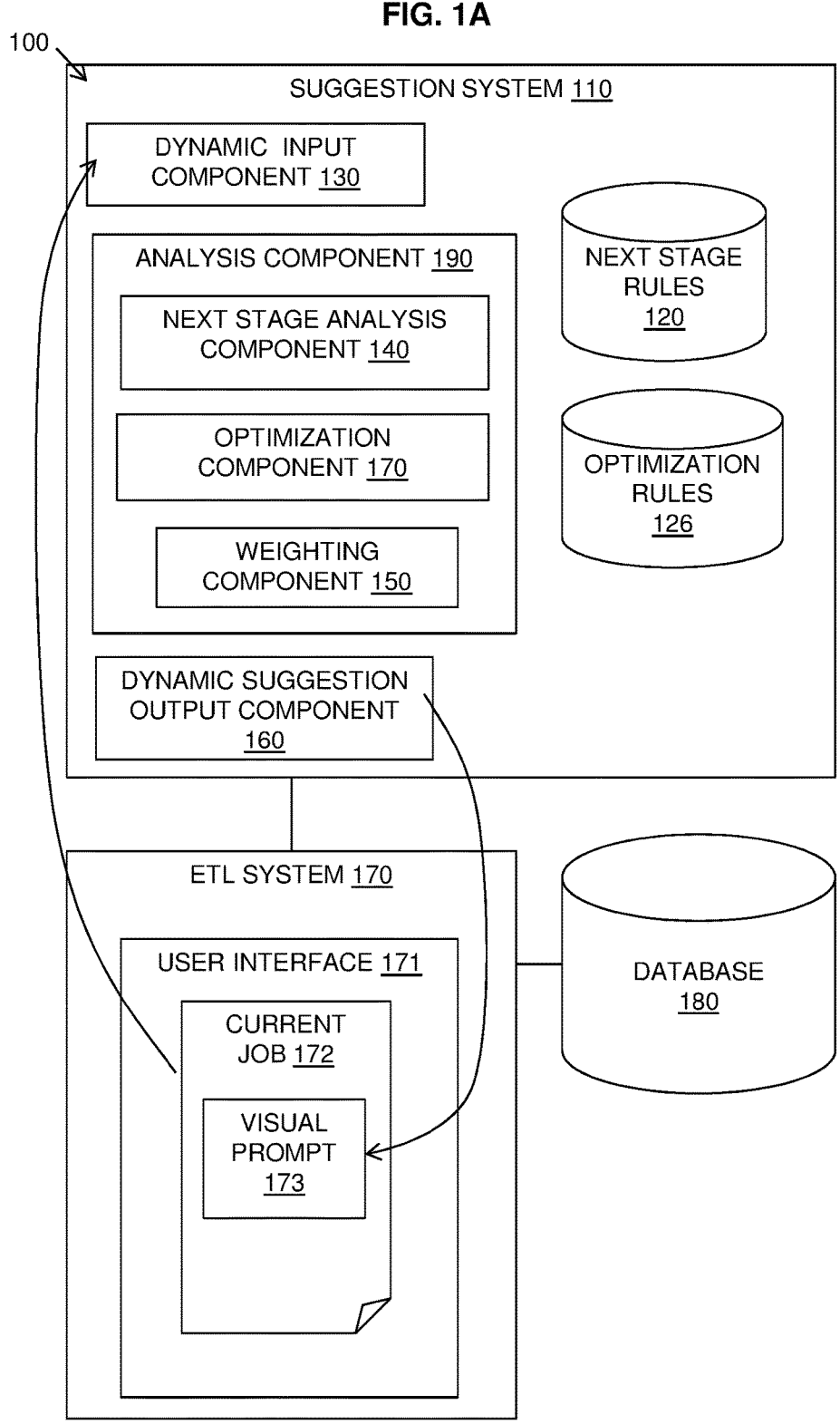
FIGS. 1A, 1B, and 1C are block diagrams of a system in accordance with exemplary embodiments.

Referring to FIG. 1A, an example embodiment of the described system 100 is shown in which a suggestion system 110 is provided for an ETL system 170, which is operating on a database 180. The suggestion system 110 may be provided as an integrated component of an ETL system 170 or may be provided remotely to the ETL system 170. The ETL system 170 may operate on multiple databases 180, which may be local or remotely distributed.

The ETL system 170 includes a user interface 171, which is often provided as a graphical canvas onto which an ETL developer may generate a current job 172. The ETL developer may drag and drop stages into the user interface linking their input and outputs together. The stages chosen, the way they are joined together, and the value of properties set will together satisfy the high level requirements for that job.

In the described system, a suggestion system 110 is provided which provides dynamic suggestions for a current job 172 in the user interface 171 or the ETL system 170 by means of a visual prompt 173 providing next suggested stages and, optionally, additional optimization in the current job.

The suggestion system 110 has defined rules, which may include defined next stage rules 120 and optimization rules 126 which are described in detail below. In addition, the suggestion system 110 includes a dynamic input component 130 providing input from the current job 172 of the ETL system 170. The dynamic input component 130 determines when a new stage or action has been input in the current job 172 by the ETL developer.

The suggestion system 110 includes an analysis component 190 for analyzing the dynamically updated new input in the current job 172 with respect to the defined rules which may include the next stage rules 120 and the optimization rules 126 to determine one or more suggestions of next inputs which may be provided to the user interface 171 of the ETL system 170 as a visual prompt 173.

The analysis component 190 may include a next stage analysis component 140 for analyzing a new stage input and applying next stage rules 120. The analysis component 190 may also include an optimization component 170 for applying the optimization rules 126 to a new input in the form of a new stage or action in the current job to provide an optimization suggestion in a visual prompt 173.

The analysis component 190 may include a weighting component 150, which applies weightings to the suggested next inputs, and the weighting may be visually represented in the visual prompt 173.

The suggestion system 110 may include a dynamic suggestion output component 160, which dynamically updates the visual prompt 173 of the suggested next inputs as the current job 172 is developed and new stages are added or actions taken by the ETL developer.

Figure 1B:
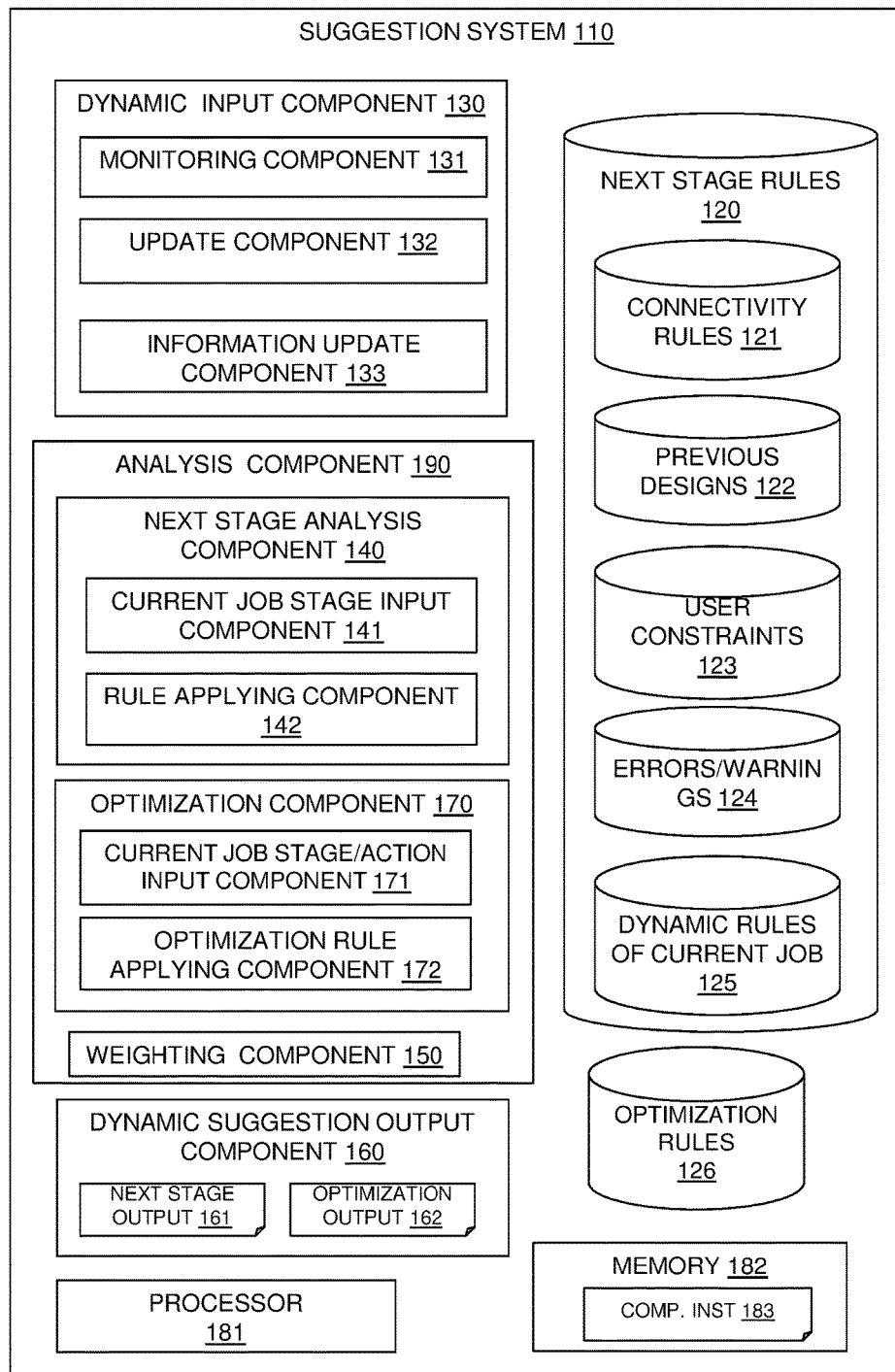

Referring to FIG. 1B, the components of the suggestion system 110 of the example embodiment described in FIG. 1A are described in further detail.

The suggestion system 110 may include at least one processor 181, a hardware module, or a circuit for executing the functions of the described components which may be software units executing on the at least one processor. Multiple processors running parallel processing threads may be provided enabling parallel processing of some or all of the functions of the components. Memory 182 may be configured to provide computer instructions 183 to the at least one processor 181 to carry out the functionality of the components.

The dynamic input component 130 of the suggestion system 110 may include a monitoring component 131 for monitoring the current job input in the form of a stage, an action or properties of a stage added by the ETL developer in the current job, or an action taken by the ETL developer in the current job, for example, the ETL developer may connect existing stages together. The dynamic input component 130 may include an update component 132 for providing the current job stage/action from the ETL system 170 when this is updated. These components enable a current job stage to be provided to the analysis component 140 and received in a current job stage input component 141.

The dynamic input component 130 may also include information update component 133 for updating a subset of the next stage rules 120, which provides dynamic rules 125, based on the current job to date, or updating other information relating to the current job 125. Patterns may be provided in a current job that may be repeated in the current job; therefore, the dynamic rules 125 are updated either with each new stage or periodically to record the current job to date.

As described in relation to FIG. 1A, there is provided an analysis component 190 which may include a next stage analysis component 140 and/or an optimization component 170. The analysis component 190 may include a weighting component 150 which may weight the analysis to provide a weighting of the suggested next inputs.

The next stage analysis component 140 may include a rule applying component 142 for applying the current job stage as received in the current job stage input component 141 to the next stage rules 120 to provide one or more suggested next stages in the current job 172. The next stage rules 120 may include connectivity rules 121, rules based on previous designs of jobs 122, user constraint rules 123, error/warning rules 124, and dynamic rules of the current job 125.

An optimization component 170 may have a current job stage/action input component 171 for receiving the current job stage/action from the current job stage/action update component 132. As an alternative to receiving a current job stage input, a current job action may be input received. An optimization rule applying component 172 may apply the optimization rules 126 as described further below. The optimization rule applying component 172 may provide optimization suggestions for the current job of the ETL system.

A dynamic suggestion output component 160 may be provided in the suggestion system 110, which may output suggestions from the next stage analysis component 140 and/or the optimization component 170 as next stage outputs 161 and/or optimization outputs 162 respectively. The output suggestions are transferred to the user interface of the ETL system.

Figure 1C:
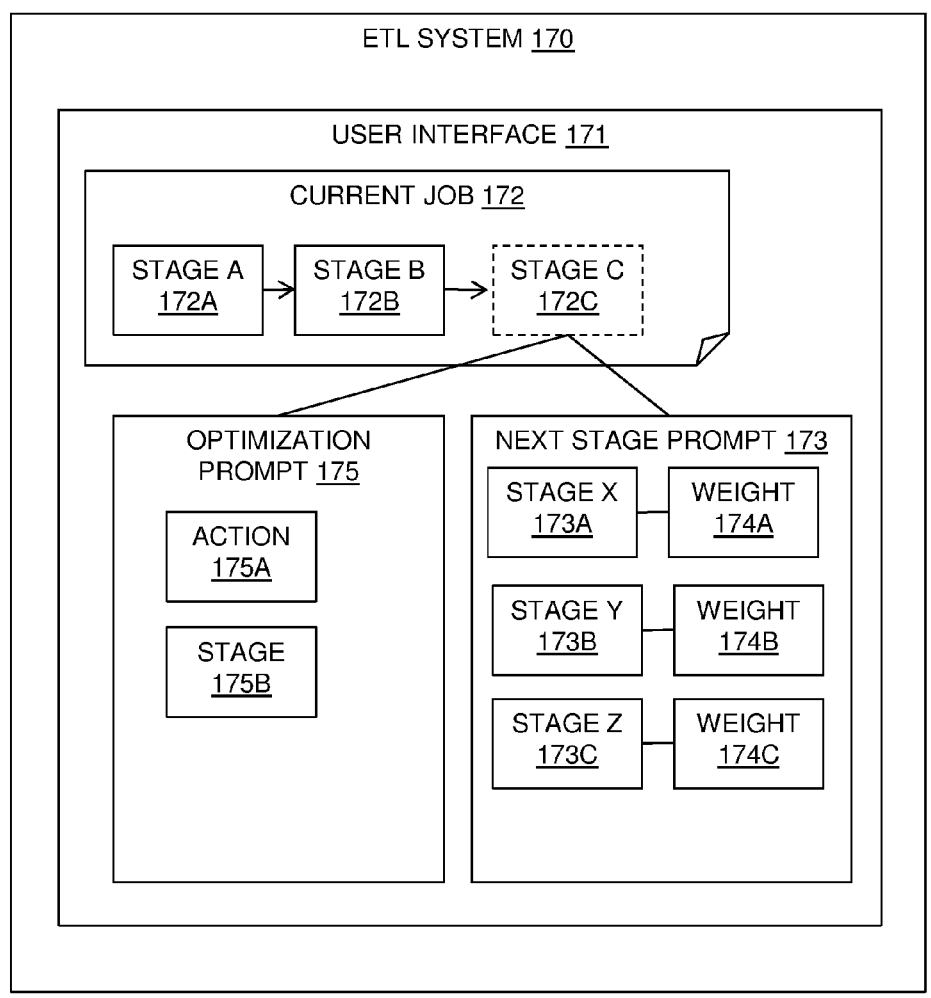

Referring to FIG. 1C, a diagram shows further details of the resultant display at the user interface 171 of the ETL system 170.

A current job 172 is illustrated in simplified form as including a first stage "stage A" 172A connected to a second stage "stage B" 172B with a new third stage "stage C" 172C which has just been entered by the ETL developer.

The suggestion system provides a next stage prompt 173 in the user interface 171 for options for the next stage, which are shown as "stage X" 173A with a weighting 174A, "stage Y" 173B with a weighting 174B, and "stage Z" 173C with a weighting 174C. The ETL developer may select one of the suggested next stages or may enter something else.

An optimization prompt 175 may also be provided with suggested actions 175A or stages 175B based on the suggestion system's optimization rules. The suggested actions 175A or stages 175B may also have weightings applied. If an action is taken by the ETL developer, just an optimization prompt 175 may be provided. If a new stage is added by the ETL developer, just a next stage prompt 173 or both a next stage prompt 173 and an optimization prompt 175 may be provided.

Next stage rules are for suggesting a next stage based on the previously added stage. Optimization rules are for refining the design based on user actions. Some examples are as follows:
  User adds a sequential file stage, the next stage prompt 173 opens up, showing a list of suggested stages such as transformer/column import, etc.
  User adds a connector stage, the next stage prompt 173 opens up, showing a list of suggested stages such as transformer/column import, etc. along with optimization prompt 175 showing the existing connection properties for the user to choose from.
  User connects two stages by a link, optimization prompt 175 shows up to suggest the user a list of optimized stage properties, such as sorting options or existing connection properties if one of the stage is a connector stage.

Figure 2:
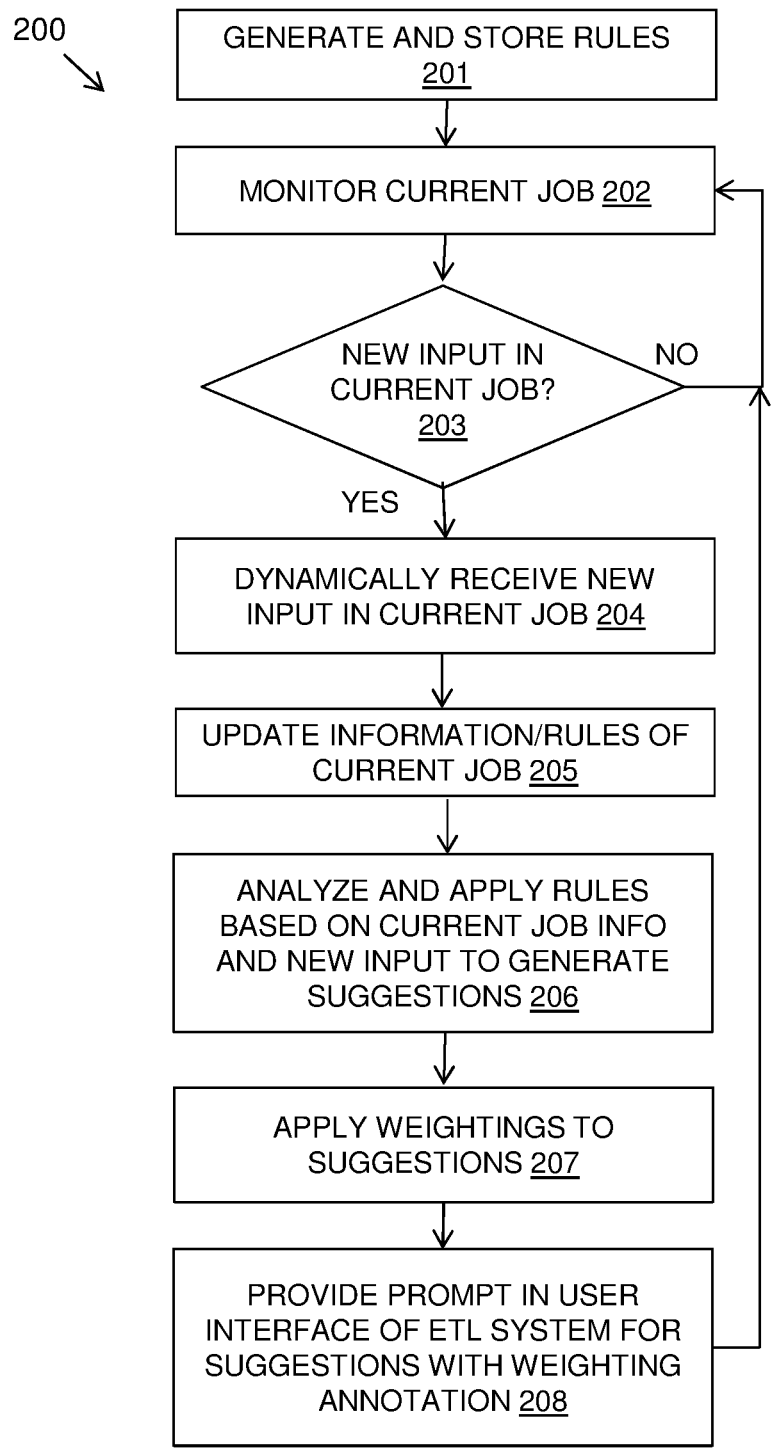
FIG. 2 is a flow diagram of a method in accordance with exemplary embodiments.

Referring to FIG. 2, a flow diagram 200 illustrates an example of the described method.

Rules may be generated and stored at block 201; the rules may be next stage rules and/or optimization rules and may be static and/or dynamic rules. The rules may be applicable to categories of jobs created using an ETL system and may be dynamic as they are adapted to the ongoing development of a current job.

A current job in an ETL system may be monitored at block 202 and it may be determined at block 203 if a new input is made to the current job. An input may be a new stage input, a connection between stages input, or a property of a stage input. If no new input has been made the method loops to continue monitoring at block 202 the current job.

If a new input has been made to the current job, the new input is dynamically received at block 204 for analysis. The information or rules relating to the current job may be updated at block 205 for use in the analysis.

The new input is analyzed at block 206 and rules applied to it based on the current job information to generate suggested inputs. Weightings may be applied at block 207 to the suggested inputs.

A prompt may be provided at block 208 in a user interface of the ETL system for providing suggested inputs with weighting annotations.

Figure 3A:
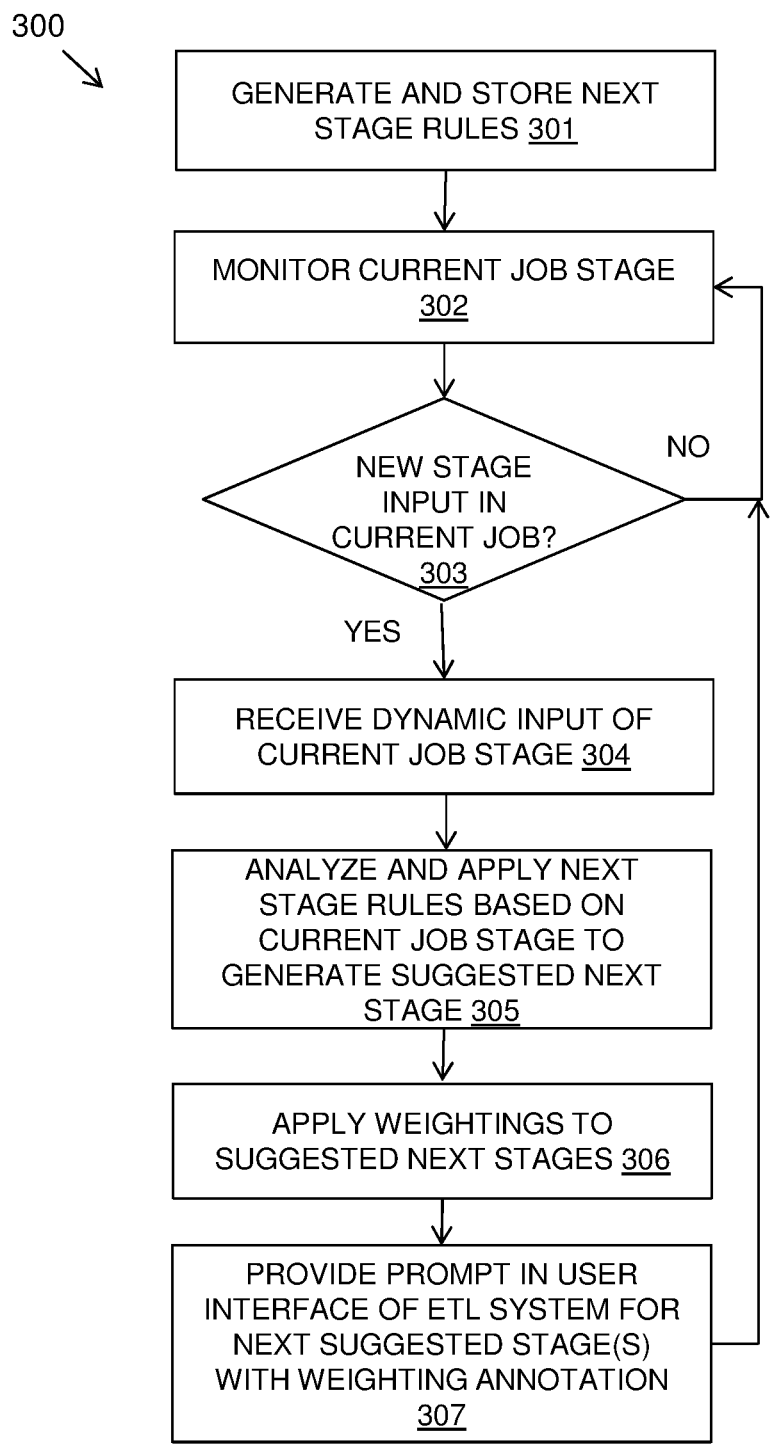
FIG. 3A is a flow diagram of a method in accordance with exemplary embodiments.
Figure 3B:
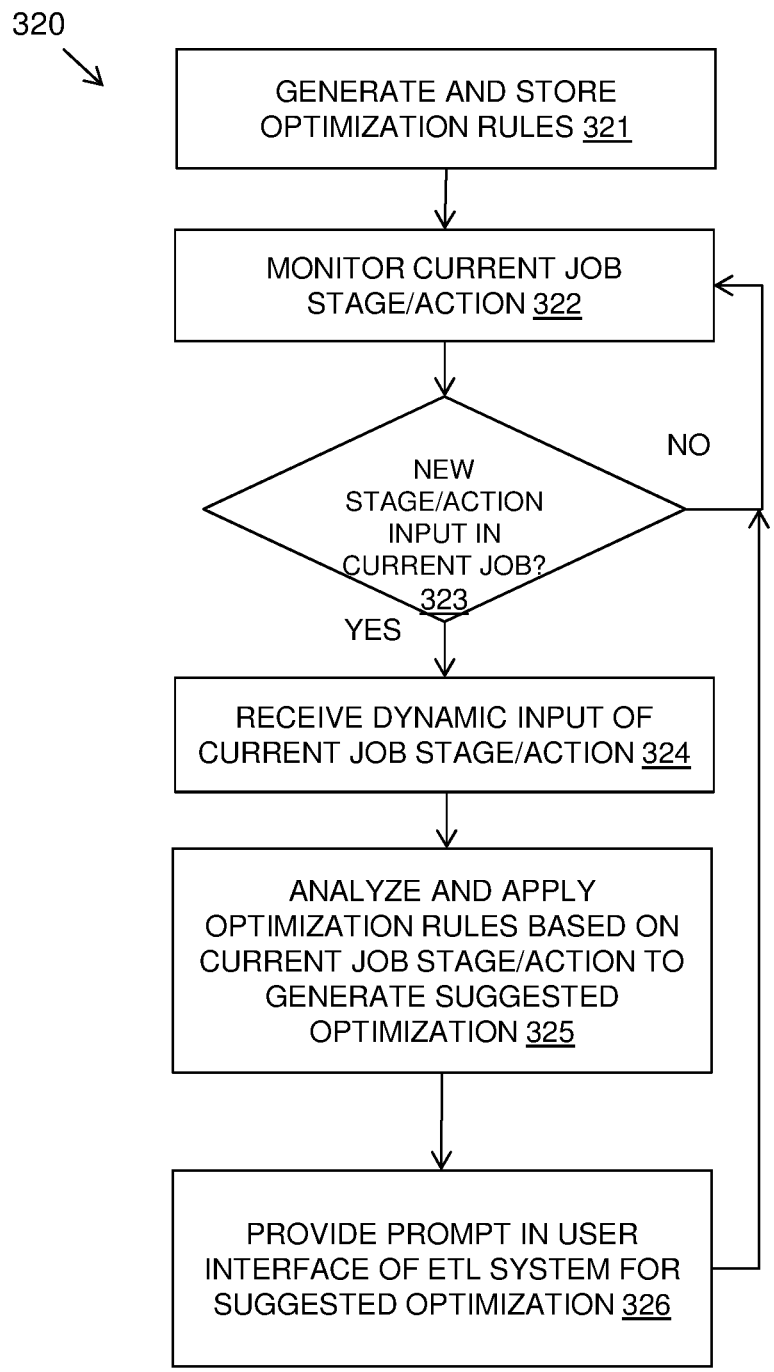
FIG. 3B is a flow diagram of a method in accordance with exemplary embodiments.

Two example embodiments of categories of suggestions that may be produced, next best stage and optimization. FIG. 3A shows a flow diagram 300 for generating next stage suggestions. FIG. 3B shows a flow diagram 320 for generating optimization suggestions. The next stage suggestions and optimization suggestions may be used independently or together depending on the input received.

Referring to FIG. 3A a flow diagram 300 shows an example embodiment of the described method as carried out at the suggestion system 110 for generating context sensitive next best stage suggestion(s) to an ETL system.

Next stage rules may be generated and stored at block 301 for access by the suggestion system 110.

The current job stage may be monitored at block 302. It may be determined at block 303 if a new stage is input in the current job. If no new stage is input, the method loops to continue monitoring at block 302. If a new stage is determined, the suggestion component 110 may receive at block 304 dynamic input of the current job stage.

The current job stage may be analyzed and the next stage rules applied at block 305 to generate suggested next stage(s) in the current job based on the current job stage.

Weightings may be applied at block 306 to the suggested next stage(s). Analyzing the rules and the current state of an ETL job may create a list of strength indicators (for example, showing the degree of confidence for each piece of information) for each suggestion.

An example of weightings may be considered if user has added a Sequential File stage with one variable-string column as metadata, the next stage rules. The suggested next stages are as follows:
  Column import is used to split one column into multiple columns;
  Transformer can do the same issue as column import but with more cost;
  Copy basically replicate data in case the user wants to have two sub-flows based on the same input data; and
  Remdup/filter (remove duplicates filter) is suggested in case the user wants to reduce the amount of input data before applying any transformation logic.

With weighting applied to the suggestions, the list of stages may be provided in this order: column import/transformer/copy/remdup/filter.

Column import can have the highest weight because it generates the actual metadata that the further transformation relies on.

A prompt may be provided at block 307 by the suggestion system 110 in the user interface of the ETL system for next suggested stage(s) with weighting annotation.

The method may loop to continue monitoring the current job stage at block 302. As an ETL developer selects a next new stage, which may be based on the suggestions provided in the prompt, the new stage input is determined at block 303 and the method continues until the job ends.

Next Best Stage Suggestion Rules

The following rules may be used to generate a weighted list for next best stage.

The connectivity of the last stage that was added. Depending on the specific stage, some stages may be used for output only (a source stage), others input only (a target stage), and some may be used for both input and output (a processing stage). Furthermore, inputs may be subdivided into reference or stream inputs and outputs subdivided into reject and stream outputs. A stage may also have minimum and maximum requirements, for example, having one and only one output link, or a minimum of one input link but no maximum. This information may be used to ensure only stages with valid connections are considered for next best stage.

Built-in patterns of existing stages in the job design. There may be well known patterns for multiple stages being used together, if the last added stage or stages looks like it will match one of those patterns this would be given a higher weighting. Some example patterns are:
  read from a sequential file, process it in a transformer stage, and output it again to a different sequential file;
  the reference input to lookup stages often comes from the output of a database stage;
  the output from a source stage will often be joined to a processing stage rather than directly to a target stage;
  a write to a database stage often has a reject output in case the write fails;
  reject outputs often use sequential file or dataset stages.

User configurable patterns that define commonly used layouts of stages for a specific customer environment. For example, an administrator may choose to promote specific stage configurations as a best practice for their developers and may register those patterns to increase the strength indicator when recognizing an appropriate match with a preferred pattern.

Dynamic patterns based on previous usage of stages in job designs within the current user's environment. For example, a user may frequently use similar patterns of stage layouts when designing jobs and could optionally choose to include that previous usage information when determining the relative strength indicators for next best stage.

Potential errors or warnings that would be generated if the stage were to be used next. This would help prevent the ETL developers from selecting incorrect or non-optimal stages. For example, a sort stage may not be weighted as highly as a next best stage if the data has already been sorted (although it may still be present in the list as there are other legitimate use cases).

Referring to FIG. 3B, a flow diagram 320 shows an example embodiment of the described method as carried out at the suggestion system 110 for generating context sensitive optimization suggestion(s) to an ETL system.

Optimization rules may be generated and stored at block 321 for access by the suggestion system 110.

The current job stage or action may be monitored at block 322. It may be determined at block 323 if a new stage or action is input in the current job. If no new stage or action is input, the method loops to continue monitoring at block 322. If a new stage or action is determined, the suggestion component 110 may receive at block 324 dynamic input of the current job stage or action.

The current job stage or action may be analyzed and the optimization rules applied at block 325 to generate suggested optimizations in the current job based on the current job stage or action.

A prompt may be provided at block 306 by the suggestion system 110 in the user interface of the ETL system for optimization.

The method may loop to continue monitoring the current job stage at block 322. As an ETL developer selects a next new stage or action, which may be based on the suggestions provided in the prompt, the new stage or action input is determined at block 323 and the method continues until the job ends.

Optimization Suggestion Rules

Mapping Simplification

The user may use a transform stage to do some mapping between input and output:
  directly map some input columns to output columns;
  specifically handle some input columns whose value is null with a valid value of the given data type;
  simply replicate some output columns using input columns;
  explicitly convert some input columns to output columns.

There is no complex transformation logic in this example so the system will recommend replacing transformer with modify.

Constraints Simplification

The user specifies a transform stage to split the input stream into multiple output streams based on some constraints. There is no complex transformation logic in this example so the system will recommend replacing transformer with filter.

Column Import Export

The user drops a column import stage on to the canvas. All the data source stages are highlighted as the dropping area. The one with a single string column is marked to indicate the highest strength. Similarly, the user drops a column export stage on the canvas. All the data target stages are highlighted as the dropping area. The one with a single string column is marked to indicate the highest strength.

Lookup with Multiple Tables

The user connects multiple lookup stages together, each with a separate lookup table. The system recommends the user to combine those multiple lookup stages into one lookup with multiple reference tables.

Inconsistent Sort Keys

The user drops a sort stage on a link leading to a key-based operator. The sort keys do not fulfill the sort requirements of the key-based operator. The system highlights the sort stage and recommends the user to remove it.

Aggregation in Transformer

The user designs a fork-join pattern to perform aggregation and merge the aggregated data back to the original data. The system highlights this pattern and recommends the user to replace it with Transformer looping.

Parallel Export

If the input data to a sequential file stage is sorted, the system recommends the user to set the write mode to parallel and save data in multiple files based on the key value and pre-defined file size.

This technique allows for immediate visual feedback to the ETL developer to help them design the job using predefined rules containing best practice or per-project requirements. In addition to this, because the feedback is based on the current ETL job context the developer is working in, it will change as the user modifies the job design, keeping them relevant to the current state of the job.

The strength indication within the context of constructing an ETL job design provides context sensitive feedback and rule-based recommendations to a user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
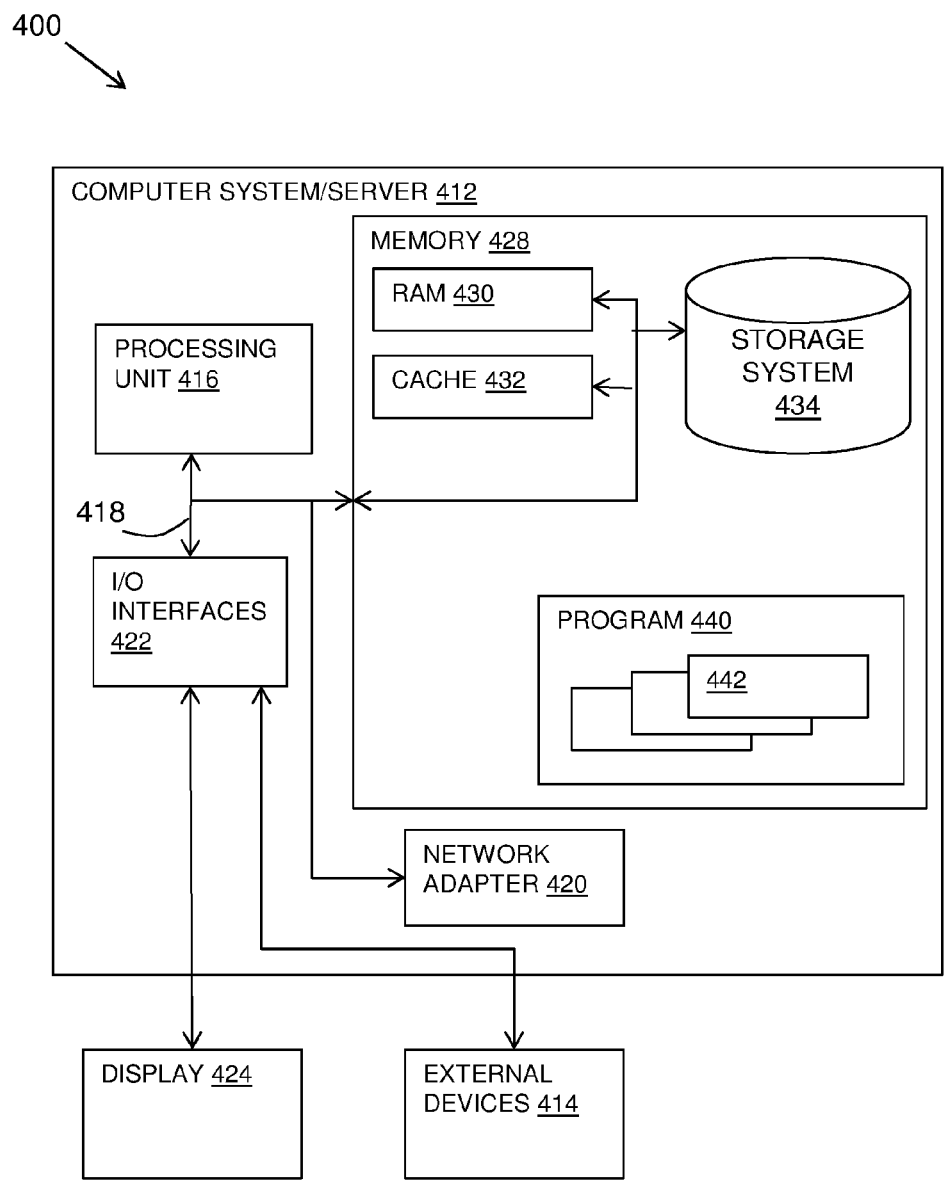
FIG. 4 is a block diagram of a computer system or cloud server in which exemplary embodiments may be implemented.

Referring now to FIG. 4, a schematic of an example of computer system or server 412 is shown which may be implemented as a cloud computing node 400. Alternatively, such a computer system or server 412 may be implemented in a non-cloud environment to provide the described processing.

Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
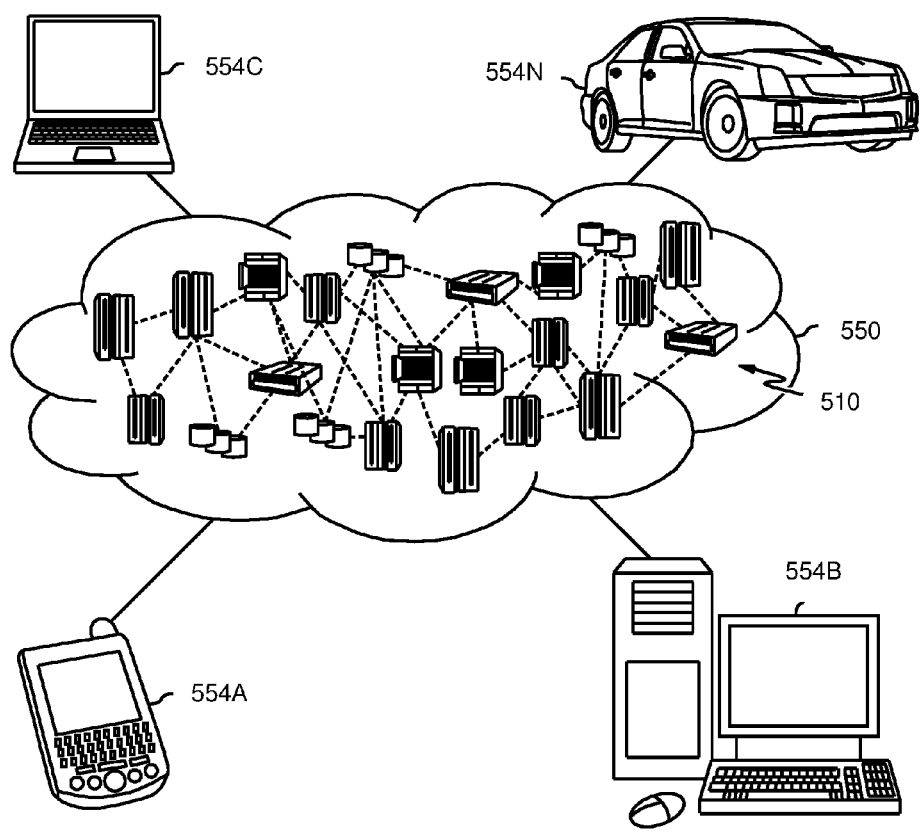
FIG. 5 is a schematic diagram of a cloud computing environment in which exemplary embodiments may be implemented.

Referring now to FIG. 5, illustrative cloud computing environment 550 is depicted. As shown, cloud computing environment 550 comprises one or more cloud computing nodes 400 with which local computing devices used by cloud consumers, such as, for example, personal digital assistant (PDA) or cellular telephone 554A, desktop computer 554B, laptop computer 554C, and/or automobile computer system 554N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 400 and cloud computing environment 550 can communicate with any type of computerized device over any type of network and/or network addressable connection (e.g., using a web browser).

Figure 6:
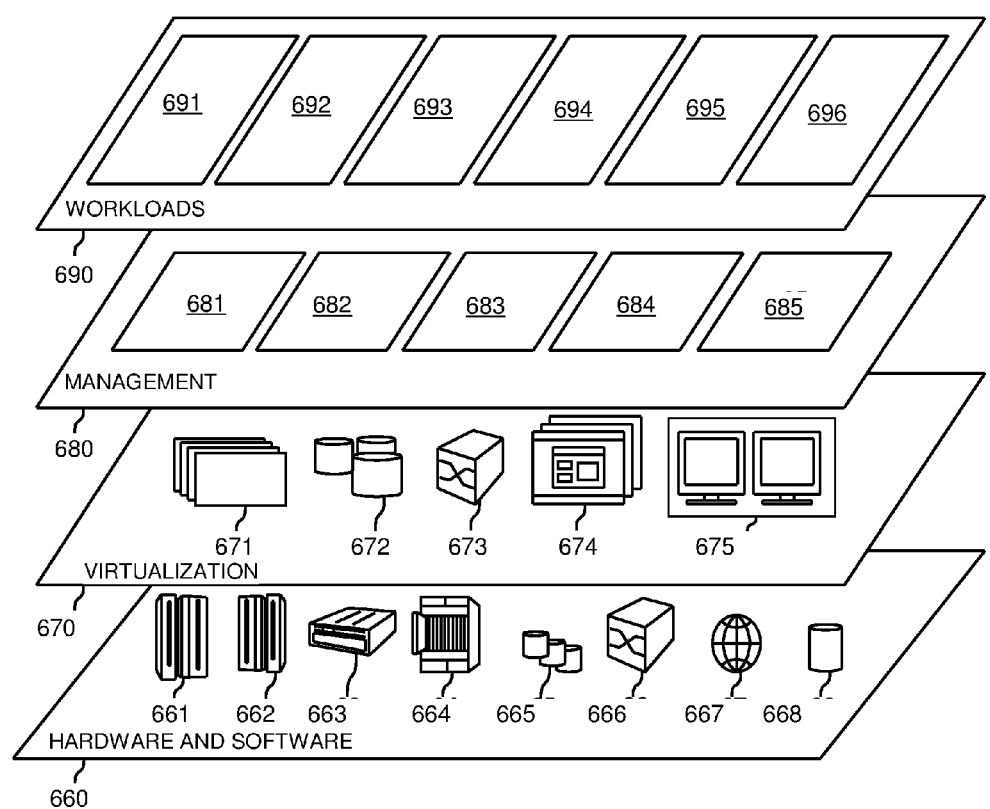
FIG. 6 is a diagram of abstraction model layers of a cloud computing environment in which exemplary embodiments may be implemented.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; and transaction processing 695; and other functionality 696 such as the described ETL system processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for extract transform load (ETL) input suggestion for an ETL system in which a current job is being created, comprising:
    determining, by a computer processor, when a new input is made in the current job in the ETL system and dynamically receiving the new input, the new input a connection between stages input;
    updating stored information relating to the current job with the new input;
    accessing rules which apply to creating the current job, the rules including one or more next stage rules and one or more optimization rules for optimizing the current job;
    analyzing and applying, by the computer processor, the rules based on the new input and the current job stored information to generate one or more suggested next inputs in the current job, the one or more suggested next inputs selected from the group consisting of a new stage input, a connection between stages input, and a property of a stage input;
    providing a weighting for the one or more suggested next inputs based on the analysis and application of the rules;
    providing a prompt in the current job in the ETL system with the suggested one or more next inputs and their weightings; and
    monitoring the current job to determine when a new input is made in the current job in the ETL system and iterating the updating, accessing, analyzing and applying, providing a weighting, and providing a prompt for each new input,
    wherein updating stored information relating to the current job with the new input includes updating a dynamic set of rules which apply to the current job, wherein the dynamic set of rules are one or both of next stage rules and optimization rules, and
    wherein the current job is executed in a first sequence prior to receiving the first input and in a second sequence subsequent to receiving the first input.

2. The method of claim 1, wherein providing a prompt for the current job includes a visual indication of the one or more suggested inputs and an annotation as to their weightings.

3. The method of claim 1, wherein providing a weighting for the one or more suggested next inputs is based on a determination of the logic of the current job and the outcome of the suggested next input.

4. The method of claim 1, wherein the optimization rules are selected from the group consisting of constraint simplification, column import or export, lookup with multiple tables, inconsistent sort keys, aggregation in a transformer, parallel export, and metadata of input data.

5. A computer program product for extract transform load (ETL) input suggestion for an ETL system in which a current job is being created, the computer program product comprising a non-transitory computer readable storage medium having program instructions embodied therewith, the program instructions executable by a processor to cause the processor to:
    determine when a new input is made in the current job in the ETL system and dynamically receiving the new input, the new input a connection between stages input;
    update stored information relating to the current job with the new input;
    access rules which apply to creating the current job, the rules including one or more next stage rules and one or more optimization rules for optimizing the current job;
    analyze and applying the rules based on the new input and the current job stored information to generate one or more suggested next inputs in the current job, the one or more suggested next inputs selected from the group consisting of a new stage input, a connection between stages input, and a property of a stage input;
    provide a weighting for the one or more suggested next inputs based on the analysis and application of the rules;
    provide a prompt in the current job in the ETL system with the suggested one or more next inputs and their weightings; and
    monitor the current job to determine when a new input is made in the current job in the ETL system and iterating the updating, accessing, analyzing and applying, providing a weighting, and providing a prompt for each new input,
    wherein updating stored information relating to the current job with the new input includes updating a dynamic set of rules which apply to the current job, wherein the dynamic set of rules are one or both of next stage rules and optimization rules, and wherein the current job is executed in a first sequence prior to receiving the first input and in a second sequence subsequent to receiving the first input.

6. The computer program product of claim 5, wherein providing a prompt for the current job includes a visual indication of the one or more suggested inputs and an annotation as to their weightings.

7. The computer program product of claim 5, wherein providing a weighting for the one or more suggested next inputs is based on a determination of the logic of the current job and the outcome of the suggested next input.

8. The computer program product of claim 5, wherein the optimization rules are selected from the group consisting of constraint simplification, column import or export, lookup with multiple tables, inconsistent sort keys, aggregation in a transformer, parallel export, and metadata of input data.

9. A system for extract transform load (ETL) input suggestion for an ETL system in which a current job is being created, the system comprising:
- a memory having computer readable instructions; and
- a processor for executing the computer readable instructions, the computer readable instructions including:
  - determining when a new input is made in the current job in the ETL system and dynamically receiving the new input a connection between stages input;
  - updating stored information relating to the current job with the new input;
  - accessing rules which apply to creating the current job, the rules including one or more next stage rules and one or more optimization rules for optimizing the current job;
  - analyzing and applying, by the computer processor, the rules based on the new input and the current job stored information to generate one or more suggested next inputs in the current job, the one or more suggested next inputs selected from the group consisting of a new stage input, a connection between stages input, and a property of a stage input;
  - providing a weighting for the one or more suggested next inputs based on the analysis and application of the rules;
  - providing a prompt in the current job in the ETL system with the suggested one or more next inputs and their weightings; and
  - monitoring the current job to determine when a new input is made in the current job in the ETL system and iterating the updating, accessing, analyzing and applying, providing a weighting, and providing a prompt for each new input,
- wherein updating stored information relating to the current job with the new input includes updating a dynamic set of rules which apply to the current job, wherein the dynamic set of rules are one or both of next stage rules and optimization rules, and
- wherein the current job is executed in a first sequence prior to receiving the first input and in a second sequence subsequent to receiving the first input.

10. The system of claim 9, wherein providing a prompt for the current job includes a visual indication of the one or more suggested inputs and an annotation as to their weightings.

11. The system of claim 9, wherein providing a weighting for the one or more suggested next inputs is based on a determination of the logic of the current job and the outcome of the suggested next input.

12. The system of claim 9, wherein the optimization rules are selected from the group consisting of constraint simplification, column import or export, lookup with multiple tables, inconsistent sort keys, aggregation in a transformer, parallel export, and metadata of input data.

* * * * *